United States Patent [19]

Stude

[11] 4,429,480
[45] Feb. 7, 1984

[54] DIVING SPEAR

[76] Inventor: Rodney C. Stude, 8163 E. Mineral Dr., Englewood, Colo. 80110

[21] Appl. No.: 361,450

[22] Filed: Mar. 24, 1982

[51] Int. Cl.³ ............................................ A01K 81/04
[52] U.S. Cl. .......................................................... 43/6
[58] Field of Search ........................... 43/6, 5; 294/61; 124/17

[56] References Cited

U.S. PATENT DOCUMENTS

| | | | |
|---|---|---|---|
| 3,210,880 | 10/1965 | Grenier | 43/6 |
| 3,766,678 | 10/1973 | Reaves | 43/6 |
| 4,052,808 | 10/1977 | Crabtree | 43/6 |
| 4,209,929 | 7/1980 | Mishima | 43/6 |

Primary Examiner—Gene P. Crosby
Attorney, Agent, or Firm—Bruce G. Klaas; William P. O'Meara

[57] ABSTRACT

A diving spear with increased range capabilities. An elastic loop for generating thrust mounted on a string which is slideably mounted in an elongate cavity at the aft end of the spear is disclosed. An elongate sleeve used to stiffen the string to aid reinsertion in the elongate cavity is described. Attachment, removal, and replacement of the surgical tubing and string and the structure and use of various attachment devices are also described.

13 Claims, 7 Drawing Figures

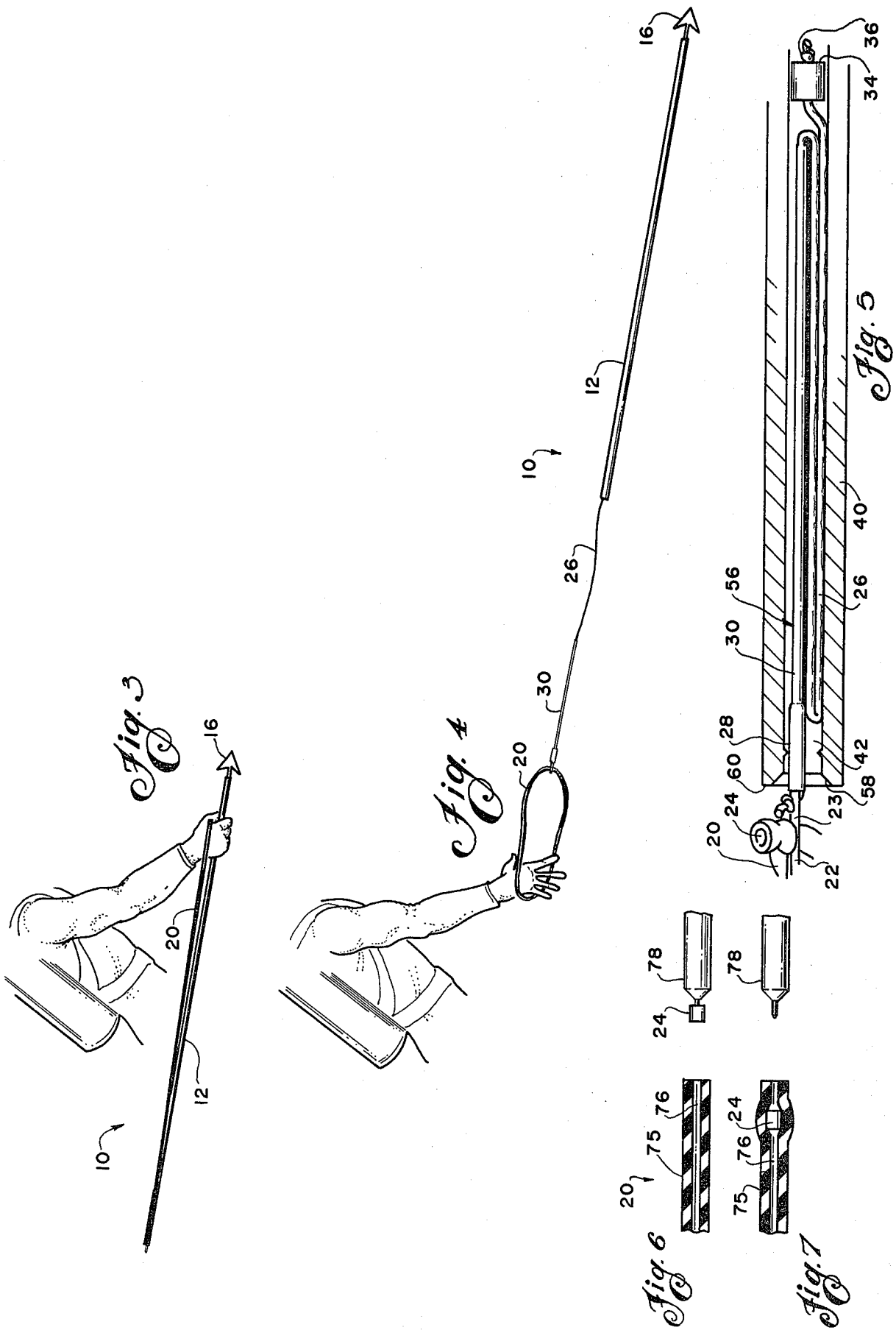

DIVING SPEAR

BACKGROUND OF THE INVENTION

The present invention relates generally to equipment used for spear fishing and more particularly to a hand launched diving spear.

With the increased popularity of scuba diving in recent years, a number of spear fishing devices have become generally available to divers. Spearguns firing a one or two foot spear are available in models using various propulsion means such as compressed gas or explosive charges. Such devices generally have good range capabilities, on the order of 10 to 12 feet, but have a number of drawbacks. Divers often use hand held spears as poles or prods to push away from objects or to keep aggressive fish such as sharks and the like at a distance. Spears used in spearguns are relatively short and are not effective for these purposes. In addition, most spearguns have only a single shot capability which leaves the diver relatively unprotected until the gun can be reloaded. Spearguns are also subject to misfiring and are generally somewhat heavy and awkward as compared to a conventional spear. For these reasons, long shafted, hand launched diving spears are preferred by many divers. Such diving spears generally have a loop of surgical tubing or the like mounted at the end of the spear opposite the spear tip. By looping the tubing between the thumb and forefinger and pulling it into a stretched position with the hand gripping the spear tip end of the shaft, the spear is provided with a self launching mechanism capable of generating considerable thrust. However, the range of such a spear is limited to the length of the spear plus the length of the surgical tubing loop, generally a distance of about 6 or 8 feet. When such a spear is launched it develops sufficient momentum to carry it several additional feet but, if the diver releases the tubing he may loose the spear. Although it is possible to tie a restraining device such as a small rope to one end of the tubing and to the diver's wrist, the rope is subject to becoming tangled and may interfer with diving activity. It would be generally desireable to provide a hand launched fishing spear with extended range capabilities that does not have the drawbacks associated with spearguns.

SUMMARY OF THE INVENTION

The diving spear of the present invention comprises a tubular shaft with a string storage cavity in the aft end thereof. A string is attached at one end to a slide mounted in the cavity, and at the other end to a loop of surgical tubing. The string is inserted into the cavity and is retained there until the spear is launched. A stiffening means such as a semi-ridged sleeve is provided around the string at the end attached to the surgical tubing and helps a diver to reinsert the string. The spear is launched in the conventional manner by stretching the surgical tubing the length of the shaft and then releasing the spear. As the spear travels forward, the surgical tubing which remains in the hand of the diver separates from the end of the shaft. The string in the cavity uncoils and the slide moves from a forward position to an aft position. As the tubing and the string become taut, the momentum of the spear is dissipated, and the spear is restrained from further travel.

Accordingly it is an object of the present invention to provide a hand launched diving spear having an increased range. It is another object of the invention to provide a diving spear having an improved surgical tubing attachment device. It is a further object of the invention to provide a diving spear which is inexpensive to produce. It is a further object of the invention to provide a diving spear which is safe to use.

BRIEF DESCRIPTION OF THE DRAWING

An illustrative and presently preferred embodiment of the invention is shown in the accompanying drawing in which:

FIG. 3 is a perspective pictorial view of a diving spear in position to be launched;

FIG. 4 is a perspective pictorial view of a diving spear subsequent to launching;

FIG. 5 is a detail cross sectional view of the aft portion of a diving spear;

FIG. 6 is a detail cross sectional view of surgical tubing and a tubing insert mounted on a tool;

FIG. 7 is a detail cross sectional view of the surgical tubing of FIG. 6 with an implanted insert and a tool.

DETAILED DESCRIPTION OF THE INVENTION

Figure 1:
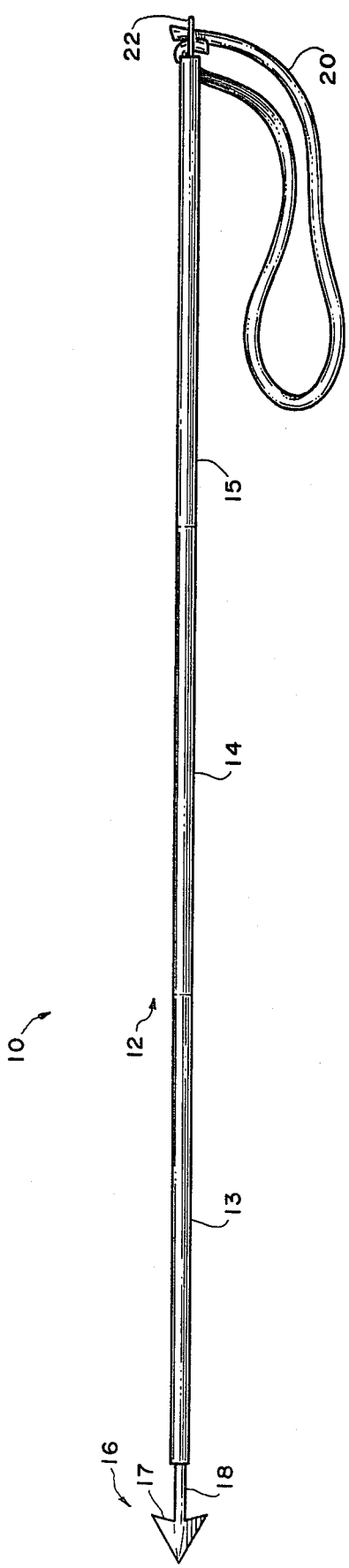
FIG. 1 is a top view of a diving spear.
Figure 2:
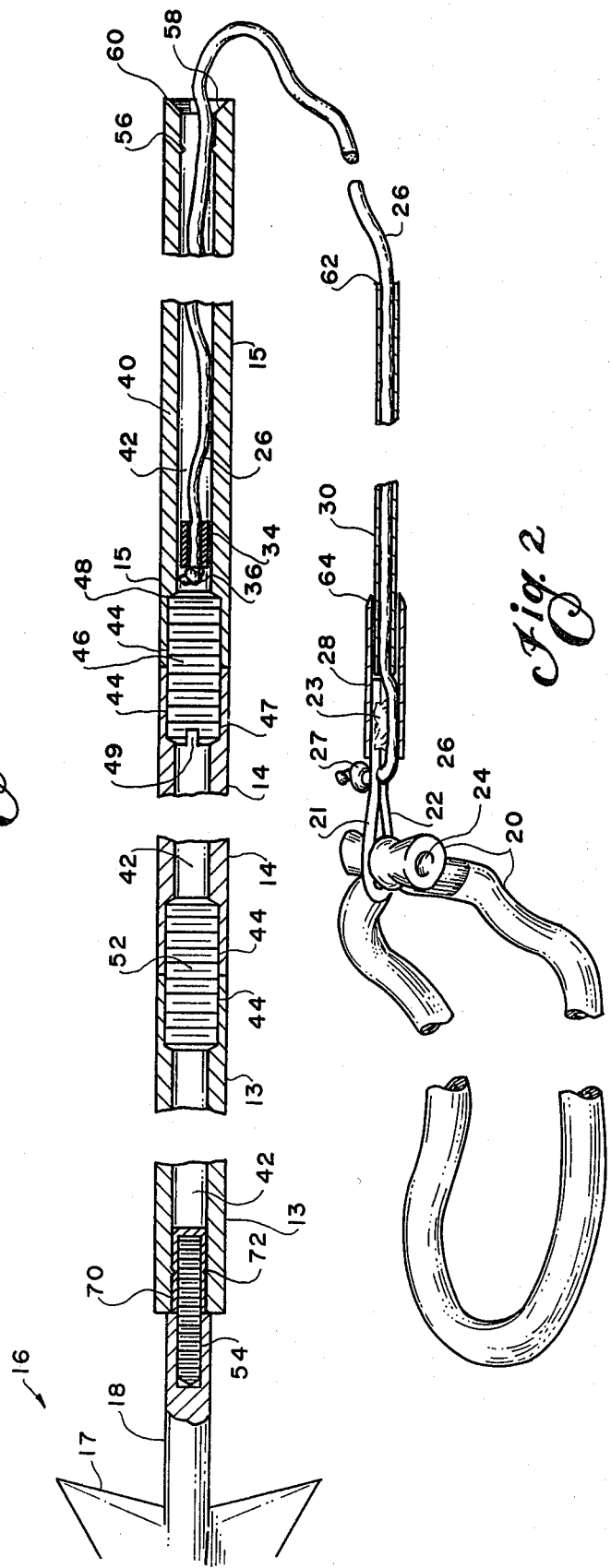
FIG. 2 is a broken cross sectional view of a diving spear.

As shown by FIG. 1, the diving spear 10 of the present invention comprises an elongate shaft 12 which may be constructed in separate sections such as a tip section 13, mid section 14 and tail section 15. The shaft 12 is mounted with a spear head 16 comprising a spear point 17 and spear head connection shaft 18. A stretchable thrust generating means such as rubber surgical tubing loop 20 is mounted at the aft end of the shaft 12 on a holding means such as holder loop 22. The holder loop 22 may be constructed from 3/32 inch brass rod which is looped and soldered at the ends to form loop portion 21 and tail portion 23. As shown by FIGS. 2, 6, and 7 surgical tubing 20 is retained in the loop by passing the free ends thereof through the loop portion 21 and thereafter inserting expanding means such as a 5/16 inch diameter copper plug 24 into the surgical tubing cavity 76. As illustrated by FIGS. 6 and 7 this may be accomplished by use of a ball point pen 78 or similar device inserted into a bore (not shown) in the copper plug and thereafter pushed into the tubing cavity 76. As shown by FIG. 2 a string means 26 such as a four and one-half foot length of 3/32 inch diameter nylon rope may be attached to the rubber holder loop 22 by passing one end thereof through the loop portion 21 and tying a knot 27 therein. The string 26 may be provided with stiffening means such as an elongate sleeve 30 which may be a fifteen and three-quarters inch length of nylon tubing of 3/16 inch outer diameter and 0.138 inch inner diameter. The nylon sleeve 30 frictionally engages the string 26 to provide sufficient structural stiffness to allow the string 26 to be quickly and easily reinserted in an elongate bore 42 in the aft portion of shaft 12 as discussed below. As shown by FIG. 2 a second sleeve 28 such as a one inch length of polyethelene tubing having a 0.25 inch outer diameter may be provided to frictionally engage the string 26, rubber holder loop tail portion 23, and a portion of the longer sleeve 30 thereby ensuring that the string 26 will not be removed from the loop 21 until the sleeve 28 is removed. It may also be seen from FIG. 2 that each shaft section 13, 14, 15 comprises a shaft wall 40 with a cylindrical shaft bore 42 therein. Mating ends of forward and mid shaft sections 13, 14 and mating ends of mid and tail shaft sections 14, 15 are provided with connection means such as tapped portions 44 adapted to accept mid stud 52 and aft stud 46. Spear head 16 may be mounted as by a female socket adapter piece 70 and forward stud 54 adapted to fit in said female adapter 70 and a threaded portion of the spear head shaft 18. Female adapter 70 may be mounted by conventional means such as crimping 72 or the like.

As illustrated by FIGS. 2 and 5, a slide means such as a cylindrical piece of metal 34 with a hole therein for attaching string means 26 by knot 36 is slidably mounted within the shaft bore 42 of tail section 15. The slide 34 may be a ½ inch length of 5/16 inch diameter copper. A stop 56 produced as by crimping or the like is provided proximate the terminal end of the tail section 15 to limit the travel of the slide 34. The tail portion end 60 may be provided with a bevel 58 having a bevel thickness exceeding the wall thickness 62 of sleeve 30 and also exceeding the wall thickness of 64 of sleeve 28 to prevent jamming of the sleeves 28, 30 when the string 26 is reinserted into the cavity 42. As shown by FIG. 5 the string 26 may be of approximately three times the length of the tail section cavity 42, the longer nylon sleeve 30 being slightly shorter than the cavity length. As may also be seen from FIG. 5, the tail section 23 of holding loop 22 extends into the bore 42 when the string 26 is retained inside. Thus when the surgical tubing loop 20 is stretched forward, the rubber holder loop 22 is urged into the cavity 42 and retains one end of the tubing loop 20 in fixed relationship with the end of the shaft 60.

As shown by FIG. 3, the diving spear 10 is "loaded" by grasping the surgical tubing loop 20 across the palm of the hand and stretching it along the length of the spear shaft 12 to a holding position near the spear head 16. As shown by FIG. 4, the spear is "fired" by releasing the grip on the spear shaft 12. Thrust from the contracting loop 20 accelerates the spear 10 through the divers hand causing it to fly forward, uncoiling the string 26 and moving the slide 34 to its aft most position before being restrained. Thus it may be seen that the effective range of the spear is increased by a distance of approximately its own length through the string and slide mechanism mounted within its interior. A short spear with midsection 14 removed might also be provided when it is desired to carry a more compact unit. When a shortened spear length is used the rubber 20 may be shortened as by looping to provide additional acceleration.

It is contemplated that the inventive concepts herein disclosed may be variously otherwise embodied and it is intended that the appended claims be construed to include alternative embodiments of the invention except insofaras limited by the prior art.

What is claimed is:

1. A diving spear with increased range capabilities for use in underwater fishing and the like comprising:
   (a) elongate shaft means for mounting a spear head having a forward end and an aft end said aft end comprising an elongate bore therein;
   (b) flexible string means insertable in said bore for increasing the range of said spear and comprising a first end and a second end said first end of said string means operably attached within said bore;
   (c) stretchable elastic thrusting means for providing longitudinal thrust to said shaft means operably attached to said second end of said string means and comprising an unstressed state and an elastically stressed state;
   and
   (d) holding means for immobilizing a portion of said thrust means relative to said elongate shaft means in said thrust means stressed state.

2. The driving spear of claim 1 further comprising elongate stiffening means for stiffening a portion of said string means for aid in inserting said string means into said bore.

3. The driving spear of claim 2 wherein said elongate stiffening means comprises a first elongate sleeve encompassing a portion of said string means proximate said second end thereof said first elongate sleeve having a first end distil said second end of said string means and a second end proximal said second end of said string means.

4. The diving spear of claim 3 further comprising slide means for slideably mounting said first end of said string means in said shaft bore.

5. The diving spear of claim 4 further comprising thrusting means attachment means for attaching said second end of said string means to said thrusting means.

6. The diving spear of claim 4 wherein said slide means is slideable substantially from end to end of said bore and further comprising keeper means operably mounted proximate the aft end of said bore for retaining said slide means in said bore.

7. The diving spear of claim 6 further comprising removable keeper means for selectively removing said slide means from said bore.

8. The diving spear of claim 6 wherein said first sleeve means extends from said second end of said string means toward said first end of said string means a distance substantially equal to one third of the length of said string means.

9. The diving spear of claim 5 wherein said thrusting means comprises a length of flexible tubing comprising a tubing cavity and having a first end and a second end and wherein said thrusting means attachment means comprises an elongate loop member comprising an elongate loop portion and an elongate tail portion, said loop portion adapted to accept said first end and said second end of said tubing in a section thereof distil said tail portion and adapted to accept said second end of said string means in a section thereof proximal said tail portion.

10. The diving spear of claim 9 wherein said thrusting means attachment means further comprises expanding means for expanding the ends of said tubing means for retaining said tubing means in said loop means comprising plugs insertable in said tubing cavity, said thrusting means attachment means further comprising a knot at the second end of said string means for retaining said string means in said loop portion and further comprising a second sleeve means encompasing said tail portion, a portion of said string means, and a portion of said first sleeve means in axial alignment and sliding frictional contact therewith.

11. The diving spear of claim 10 wherein said elongate shaft means comprises a plurality of shaft sections and shaft section connecting means for connecting said sections.

12. The diving spear of claim 11 wherein said connection means comprises tapped portions in said shaft sections and at least one screw stud adapted to fit said tapped portions.

13. The diving spear of claim 12 wherein said shaft sections comprise an aft shaft section comprising said elongate bore wherein a removable keeper means for selectively removing said slide means from said bore comprises said screw stud.

* * * * *